US010659214B2

(12) United States Patent
Chattopadhyay et al.

(10) Patent No.: US 10,659,214 B2
(45) Date of Patent: May 19, 2020

(54) MULTI-LEVEL CLOCK AND DATA RECOVERY CIRCUIT

(71) Applicant: Synopsys, Inc., Mountain View, CA (US)

(72) Inventors: Biman Chattopadhyay, Karnataka (IN); Ravi Mehta, Karnataka (IN); Sanket Naik, Karnataka (IN); Jayesh Wadekar, Pune (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/695,491

(22) Filed: Sep. 5, 2017

(65) Prior Publication Data
US 2018/0069690 A1    Mar. 8, 2018

(30) Foreign Application Priority Data
Sep. 4, 2016   (IN) .............................. 201641030210

(51) Int. Cl.
| | | |
|---|---|---|
| *H04L 7/00* | (2006.01) | |
| *H04L 7/033* | (2006.01) | |
| *H04L 7/06* | (2006.01) | |
| *H04L 7/04* | (2006.01) | |
| *H04L 27/26* | (2006.01) | |

(52) U.S. Cl.
CPC .......... *H04L 7/0025* (2013.01); *H04L 7/0029* (2013.01); *H04L 7/0087* (2013.01); *H04L 7/0331* (2013.01); *H04L 7/0334* (2013.01); *H04L 7/044* (2013.01); *H04L 7/06* (2013.01); *H04L 27/2601* (2013.01)

(58) Field of Classification Search
CPC ..... H04L 25/14; H04L 7/042; H04L 27/2601; H04L 47/6245; H04L 7/04; H04L 25/4902; H04L 2027/0093; H04L 27/0008; H04L 27/206
USPC ......................................... 375/260; 341/118
See application file for complete search history.

(56) References Cited

U.S. PATENT DOCUMENTS

| | | | |
|---|---|---|---|
| 7,215,721 B2 * | 5/2007 | Hietala | ................... H04L 1/004 375/317 |
| 7,248,640 B2 | 7/2007 | Gorecki et al. | |
| 7,545,886 B2 | 6/2009 | Sonntag et al. | |
| (Continued) | | | |

*Primary Examiner* — David C Payne
*Assistant Examiner* — Sarah Hassan
(74) *Attorney, Agent, or Firm* — Fenwick & West LLP

(57) ABSTRACT

A clock and data recovery (CDR) circuit includes first through ninth samplers, a clock recovery circuit, a level finding circuit, an offset voltage generator, and a data recovery circuit. Each of the first through ninth samplers samples a data signal based on one of first through ninth reference offset voltage levels to generate first through ninth intermediate signals, respectively. The clock recovery circuit generates the first through fourth clock signals based on the first, second, fifth, and eighth intermediate signals. The level finding circuit generates a band level signal by varying the third intermediate signal. The offset voltage generator generates one of: the fourth and seventh reference offset voltage levels, the fifth and eighth reference offset voltage levels, and the sixth and ninth reference offset voltage levels based on the band level signal. The data recovery circuit detects an output data signal based on the fourth through ninth intermediate signals.

20 Claims, 6 Drawing Sheets

(56) References Cited

U.S. PATENT DOCUMENTS

2013/0077669 A1\* 3/2013 Malipatil .......... H04L 25/03019
375/233
2015/0222418 A1\* 8/2015 Akita ..................... H03L 7/087
375/355

\* cited by examiner

MULTI-LEVEL CLOCK AND DATA RECOVERY CIRCUIT

CROSS REFERENCE TO RELATED APPLICATIONS

This application claims priority from India Patent Application 201641030210 filed on Sep. 4, 2016, the disclosure of which is incorporated by reference herein, in its entirety.

FIELD

The present invention relates generally to communication systems, and more specifically to clock and data recovery circuits.

DESCRIPTION OF THE RELATED ART

Generally, a high speed data communication system receives a data signal without an accompanying clock signal. An absence of the accompanying clock signal may result in undersampling or oversampling of the data signal. Thus, a CDR circuit is used in the high speed data communication system to generate a clock signal at a bit-rate that is equal to the bit-rate of the data signal. Further, the CDR circuit samples the data signal based on the clock signal.

The CDR circuit may receive the data signal at various amplitude levels based on various types of data transmission systems, such as a binary data transmission system and a multi-level data transmission system. The binary data transmission systems transmit binary data as the data signal that has two amplitude levels, i.e., −1 volt (V) and +1V. Multi-level data transmission systems transmit a data signal that has more than two amplitude levels to increase the transmission capacity of the data transmission system. One such multi-level data transmission system uses a pulse amplitude modulation-4 (PAM-4) modulation technique to transmit the data signal (i.e., a pulse amplitude modulation-4 signal) at four distinct amplitude levels. In the PAM-4 modulation technique, sequential pairs of bits of the binary data are encoded into four amplitude levels. For example, in the binary data transmission system, the binary data, such as binary zeros and binary ones, is represented by the data signal having the amplitude levels as −1V and +1V, respectively. In PAM-4 modulation technique, sequential pairs of bits, such as 00, 01, 10, and 11, are represented by four amplitude levels −3V, −1V, +1V, and +3V, respectively. It will be understood by a person skilled in the art that the four amplitude levels may have values other than −3V, −1V, +1V, and +3V. Henceforth, the four amplitude levels are referred to as a first amplitude level, a second amplitude level, a third amplitude level, and a fourth amplitude level.

During transmission, the data signal is deteriorated by noise and losses in the transmission channel. Thus, a data reception system includes comparators and decoding logic to eliminate the noise and correctly detect the amplitude levels of the data signal for further processing thereof. The comparators and decoding logic decipher the amplitude levels of the data signal by comparing the amplitude levels to first through third reference offset voltage levels REF_BOT, REF_MID, and REF_TOP. When the amplitude level of the data signal is less than the first reference offset voltage level REF_BOT, the decoding logic decodes that the data signal is at the first amplitude level. When the amplitude level of the data signal is between the first reference offset voltage level REF_BOT and the second reference offset voltage level REF_MID, the decoding logic decodes that the data signal is at the second amplitude level. When the amplitude level of the data signal is between the second reference offset voltage level REF_MID and the third reference offset voltage level REF_TOP, the decoding logic decodes that the data signal is at the third amplitude level. When the amplitude level of the data signal is greater than the third reference offset voltage level REF_TOP, the decoding logic decodes that the data signal is at the fourth amplitude level. For example, the data signal has −3V, −1V, +1V, and +3V as the first through fourth amplitude levels. The comparator has the first reference offset voltage level REF_BOT as the average of the first and second amplitude levels, i.e., −3V and −1V. Thus, the first reference offset voltage level REF_BOT has a value of −2V. The second reference offset voltage level REF_MID is the average of the second and third amplitude levels, i.e., −1V and +1V. Thus, the second reference offset voltage level REF_MID has a value of 0V. The third reference offset voltage level REF_TOP is the average of the third and fourth amplitude levels, i.e., +1V and +3V. Thus, the third reference offset voltage level REF_TOP has a value of +2V.

During transmission, noise and phase distortions along with non-linearity may lead to overlapping of the amplitude levels over each other or reducing the difference between the adjacent amplitude levels. This may result in inaccurate amplitude level detection. Further, inaccurate determination of the first through third reference offset voltages REF_BOT, REF_MID, and REF_TOP results in incorrect amplitude level detection. As a result, the difference in the amplitude levels is not constant. Consequently, bit-error-rate (BER) of the CDR circuit also increases.

A known technique to overcome the aforementioned problems is to use a receiver that includes data and auxiliary slicers to detect the difference between the adjacent amplitude levels of the data signal. The receiver includes an optimization unit and an adjustable bandwidth unit to keep the difference between the amplitude levels of the data signal constant. However, such a receiver uses both the data and auxiliary signals to detect the difference between the amplitude levels of the data signal.

Another known technique uses a receiver that includes a reference generator circuit that generates first through third adjustable reference offsets. The first through third adjustable reference offsets maintain a constant difference between the adjacent amplitude levels. However, generation of the first through third adjustable reference offsets cannot be controlled independently of each other. This technique also relies on using a data slicer along with an auxiliary slicer.

Another known technique to overcome the aforementioned problems is to use a receiver that includes a filter, an analog-to-digital converter (ADC), a digital signal processor (DSP), a signal integrity unit (SIU), and a microcontroller unit. The filter and the ADC are used to detect the level distribution of the data signal. Further, the DSP calculates a cumulative distribution function (CDF) and a probability distribution function (PDF) of the amplitude levels over a period of time. The SIU determines the first through third reference offsets based on the CDF and PDF. However, this technique is a slow process and requires significant hardware.

Therefore, it would be advantageous to have a CDR circuit that accurately detects the amplitude levels of the data signal and overcomes the above-mentioned limitations of the existing CDR circuits.

SUMMARY

In an embodiment of the present invention, a clock and data recovery (CDR) circuit includes first through fifth samplers, a clock recovery circuit, a level finding circuit, an offset voltage generator, and a data recovery circuit. Each of the first through fifth samplers have a first input terminal for receiving a data signal, a clock input terminal for receiving one of first and second clock signals, a second input terminal for receiving one of first through fifth reference offset voltage levels, and an output terminal for generating first through fifth intermediate signals, respectively. The clock recovery circuit has first and second input terminals connected to the output terminals of the first and fourth samplers for receiving the first and fourth intermediate signals, respectively, and first and second output terminals for generating the first and second clock signals, respectively. The level finding circuit has an input terminal connected to the output terminal of the second sampler for receiving the second intermediate signal, a first output terminal for generating a band level signal, and a second output terminal for generating the second reference offset voltage level. The level finding circuit varies the second reference offset voltage level within a predefined amplitude range for generating the band level signal. The offset voltage generator has a first input terminal connected to the first output terminal of the level finding circuit for receiving the band level signal and first through third output terminals for generating the third through fifth reference offset voltage levels, respectively. The data recovery circuit has first through third input terminals connected to the output terminals of the third through fifth samplers for receiving the third through fifth intermediate signals, respectively, and an output terminal for generating an output data signal.

In another embodiment of the present invention, a CDR circuit includes first through ninth samplers, a clock recovery circuit, a level finding circuit, an offset voltage generator, and a data recovery circuit. Each of the first through ninth samplers have a first input terminal for receiving a data signal, a clock input terminal for receiving one of first through fourth clock signals, a second input terminal for receiving one of first through ninth reference offset voltage levels, and an output terminal for generating first through ninth intermediate signals, respectively. The clock recovery circuit has first through fourth input terminals connected to the output terminals of the first, second, fifth, and eighth samplers for receiving the first, second, fifth, and eighth intermediate signals, respectively, and first through fourth output terminals for generating the first through fourth clock signals, respectively. The level finding circuit has an input terminal connected to the output terminal of the third sampler for receiving the third intermediate signal, a first output terminal for generating a band level signal, and a second output terminal for generating the third reference offset voltage level. The level finding circuit varies the third reference offset voltage level within a predefined amplitude range for generating the band level signal. The offset voltage generator has a first input terminal connected to the first output terminal of the level finding circuit for receiving the band level signal, and first through third output terminals for generating one of the fourth and seventh reference offset voltage levels, one of the fifth and eighth reference offset voltage levels, and one of the sixth and ninth reference offset voltage levels, respectively. The data recovery circuit has first through sixth input terminals connected to the output terminals of the fourth through ninth samplers for receiving the fourth through ninth intermediate signals, respectively, a first output terminal for generating an output data signal, and a second output terminal for generating a select signal.

Various embodiments of the present invention include a CDR circuit for clock and data recovery. The CDR circuit includes a multiplexer, a variable gain amplifier (VGA), a continuous time linear equalizer (CTLE), first through ninth samplers, a clock recovery circuit, a level finding circuit, an offset voltage generator, a VGA adaptation circuit, a CTLE adaptation circuit, and a data recovery circuit. The VGA receives a first data signal and a first control signal, and generates an intermediate first data signal. The CTLE receives the intermediate first data signal and a second control signal, and generates a second data signal. Each of the first through ninth samplers receives the second data signal, one of first through fourth clock signals, one of first through ninth reference offset voltage levels, and generates first through ninth intermediate signals, respectively. The first through ninth samplers compare the second data signal with the corresponding reference offset voltage level for generating the first through ninth intermediate signals, respectively. The multiplexer receives the second and fourth clock signals, and a select signal, and outputs one of the second and fourth clock signals to be received by the third sampler. The clock recovery circuit receives the first, second, fifth, and eighth intermediate signals, and generates the first through fourth clock signals. The level finding circuit receives the third intermediate signal, and generates the third reference offset voltage level and a band level signal. The level finding circuit varies the third reference offset voltage level within a predefined amplitude range for generating the band level signal. The offset voltage generator receives the band level signal, and generates one of the fourth and seventh reference offset voltage levels, one of the fifth and eighth reference offset voltage levels, and one of the sixth and ninth reference offset voltage levels. The VGA adaptation circuit receives the band level signal and generates the first control signal. The CTLE adaptation circuit receives the band level signal and generates the second control signal. The data recovery circuit receives the fourth through ninth intermediate signals and generates an output data signal and the select signal. Thus, the CDR circuit accurately detects the amplitude levels of the second data signal. Further, the CDR circuit uses the fourth through ninth intermediate signals to detect the amplitude levels of the second data signal without the requirement of any auxiliary signal. The offset voltage generator generates and controls the fourth through ninth reference offset voltage levels independently of each other; hence, the CDR circuit determines the amplitude levels of the second data signal faster in comparison to the conventional CDR circuits.

BRIEF DESCRIPTION OF DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1A:
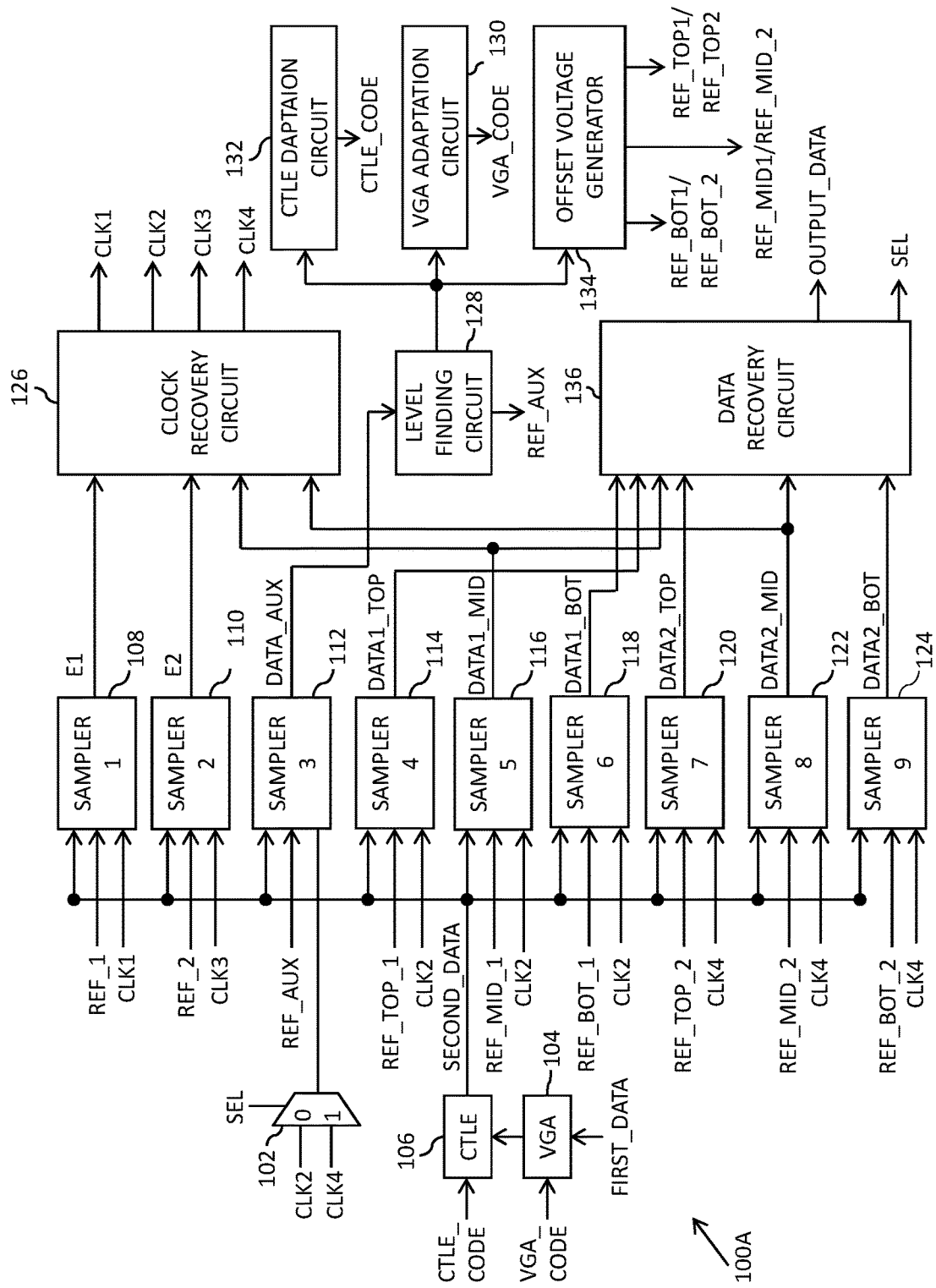
FIG. 1A is a block diagram of a CDR circuit in accordance with an embodiment of the present invention.

Referring now to FIG. 1A, a block diagram of a clock and data recovery (CDR) circuit 100A, in accordance with an embodiment of the present invention, is shown. The CDR circuit 100A is used in a data reception system (not shown) of a communication system (not shown). The CDR circuit 100A includes a multiplexer (mux) 102, a variable gain amplifier (VGA) 104, a continuous time linear equalizer (CTLE) 106, first through ninth samplers 108-124, a clock recovery circuit 126, a level finding circuit 128, a VGA adaptation circuit 130, a CTLE adaptation circuit 132, an offset voltage generator 134, and a data recovery circuit 136. The CDR circuit 100A generates first through fourth clock signals CLK1-CLK4. The first through fourth clock signals CLK1-CLK4 have a predefined phase difference between them. In one embodiment, a first predefined phase difference between the first and second clock signals CLK1 and CLK2 is 90 degrees. A second predefined phase difference between the first and third clock signals CLK1 and CLK3 is 180 degrees. A third predefined phase difference between the first and fourth clock signals CLK1 and CLK4 is 270 degrees. The mux 102 is a 2:1 mux.

The mux 102 has a first input terminal for receiving the second clock signal CLK2, a second input terminal for receiving the fourth clock signal CLK4, a select input terminal for receiving a select signal SEL, and an output terminal for outputting one of the second and fourth clock signals CLK2 and CLK4.

The VGA 104 has a first input terminal for receiving a first data signal FIRST_DATA, i.e., an input signal, from a data transmission system (not shown) of the communication system, a second input terminal for receiving a first control signal VGA_CODE, and an output terminal for generating an intermediate first data signal, i.e., an intermediate input signal. The intermediate first data signal is an amplified version of the first data signal FIRST_DATA.

The CTLE 106 has a first input terminal connected to the output terminal of the VGA 104 for receiving the intermediate first data signal, a second input terminal for receiving a second control signal CTLE_CODE, and an output terminal for outputting a second data signal SECOND_DATA. In an embodiment, the CTLE 106 is a filter that adjusts a bandwidth of the intermediate first data signal and amplifies the intermediate first data signal that has the adjusted bandwidth. In an embodiment, the second data signal SECOND_DATA is an amplified version of the intermediate first data signal. An exemplary eye diagram of the second data signal SECOND_DATA is illustrated in FIG. 2A.

The first sampler 108 has a first input terminal connected to the output terminal of the CTLE 106 for receiving the second data signal SECOND_DATA, a clock input terminal for receiving the first clock signal CLK1, a second input terminal for receiving a first reference offset voltage level REF_1, and an output terminal for generating a first intermediate signal E1. The second sampler 110 has a first input terminal connected to the output terminal of the CTLE 106 for receiving the second data signal SECOND_DATA, a clock input terminal for receiving the third clock signal CLK3, a second input terminal for receiving a second reference offset voltage level REF_2, and an output terminal for generating a second intermediate signal E2.

The third sampler 112 has a first input terminal connected to the output terminal of the CTLE 106 for receiving the second data signal SECOND_DATA, a clock input terminal for receiving one of the second and fourth clock signals CLK2 and CLK4, a second input terminal for receiving a third reference offset voltage level REF_AUX, and an output terminal for generating a third intermediate signal DATA_AUX.

In another embodiment, the mux 102 and the third sampler 112 are replaced by first and second auxiliary samplers (not shown). The first and second auxiliary samplers each receive the second data signal SECOND_DATA and the third reference offset voltage level REF_AUX. However, the first auxiliary sampler receives the second clock signal CLK2 and the second auxiliary sampler receives the fourth clock signal CLK4.

The fourth sampler 114 has a first input terminal connected to the output terminal of the CTLE 106 for receiving the second data signal SECOND_DATA, a clock input terminal for receiving the second clock signal CLK2, a second input terminal for receiving a fourth reference offset voltage level REF_TOP_1, and an output terminal for generating a fourth intermediate signal DATA1_TOP. The fifth sampler 116 has a first input terminal connected to the output terminal of the CTLE 106 for receiving the second data signal SECOND_DATA, a clock input terminal for receiving the second clock signal CLK2, a second input terminal for receiving a fifth reference offset voltage level REF_MID_1, and an output terminal for generating a fifth intermediate signal DATA1_MID.

The sixth sampler 118 has a first input terminal connected to the output terminal of the CTLE 106 for receiving the second data signal SECOND_DATA, a clock input terminal for receiving the second clock signal CLK2, a second input terminal for receiving a sixth reference offset voltage level REF_BOT_1, and an output terminal for generating a sixth intermediate signal DATA1_BOT. The seventh sampler 120 has a first input terminal connected to the output terminal of the CTLE 106 for receiving the second data signal SECOND_DATA, a clock input terminal for receiving the fourth clock signal CLK4, a second input terminal for receiving a seventh reference offset voltage level REF_TOP_2, and an output terminal for generating a seventh intermediate signal DATA2_TOP.

The eighth sampler 122 has a first input terminal connected to the output terminal of the CTLE 106 for receiving the second data signal SECOND_DATA, a clock input terminal for receiving the fourth clock signal CLK4, a second input terminal for receiving an eighth reference offset voltage level REF_MID_2, and an output terminal for generating an eighth intermediate signal DATA2_MID. The ninth sampler 124 has a first input terminal connected to the output terminal of the CTLE 106 for receiving the second data signal SECOND_DATA, a clock input terminal for receiving the fourth clock signal CLK4, a second input terminal for receiving a ninth reference offset voltage level REF_BOT_2, and an output terminal for generating a ninth intermediate signal DATA2_BOT. In one example, the first through ninth samplers 108-124 are first through ninth flip-flops, respectively.

The clock recovery circuit 126 has a first input terminal connected to the output terminal of the first sampler 108 for receiving the first intermediate signal E1, a second input terminal connected to the output terminal of the second sampler 110 for receiving the second intermediate signal E2, a third input terminal connected to the output terminal of the fifth sampler 116 for receiving the fifth intermediate signal DATA1_MID, a fourth input terminal connected to the output terminal of the eighth sampler 122 for receiving the eighth intermediate signal DATA2_MID, and first through fourth output terminals for generating the first through fourth clock signals CLK1, CLK2, CLK3 and CLK4, respectively. The first output terminal of the clock recovery circuit 126 is connected to the clock input terminal of the first sampler 108 and the third output terminal of the clock recovery circuit 126 is connected to the clock input terminal of the second sampler 110. The second and fourth output terminals of the clock recovery circuit 126 are connected to the first and second input terminals of the mux 102. The second output terminal of the clock recovery circuit 126 is further connected to the clock input terminals of the fourth, fifth, and sixth samplers 114, 116, and 118. The fourth output terminal of the clock recovery circuit 126 is further connected to the clock input terminals of the seventh, eighth, and ninth samplers 120, 122, and 124.

The level finding circuit 128 has a first input terminal connected to the output terminal of the third sampler 112 for receiving the third intermediate signal DATA_AUX, a first output terminal for generating a band level signal, and a second output terminal for generating the third reference offset voltage level REF_AUX. The second output terminal of the level finding circuit 128 is connected to the second input terminal of the third sampler 112. In one example, the level finding circuit 128 is realized by using a digital signal processor.

The VGA adaptation circuit 130 has an input terminal connected to the first output terminal of the level finding circuit 128 for receiving the band level signal and an output terminal for generating the first control signal VGA_CODE. Further, the output terminal of the VGA adaptation circuit 130 is connected to the second input terminal of the VGA 104.

The CTLE adaptation circuit 132 has an input terminal connected to the first output terminal of the level finding circuit 128 for receiving the band level signal and an output terminal for generating the second control signal CTLE_CODE. Further, the output terminal of the CTLE adaptation circuit 132 is connected to the second input terminal of the CTLE 106.

The offset voltage generator 134 has an input terminal connected to the first output terminal of the level finding circuit 128 for receiving the band level signal and first through third output terminals for generating one of the fourth and seventh reference offset voltage levels REF_TOP_1 and REF_TOP_2, one of the fifth and eighth reference offset voltage levels REF_MID_1 and REF_MID_2, and one of the sixth and ninth reference offset voltage levels REF_BOT_1 and REF_BOT_2, respectively.

The data recovery circuit 136 has first through sixth input terminals connected to the output terminals of the fourth through ninth samplers 114-124 for receiving the fourth through ninth intermediate signals DATA1_TOP-DATA2_BOT, respectively, and first and second output terminals for generating an output data signal OUTPUT_DATA and a select signal SEL, respectively.

In operation, the second data signal SECOND_DATA has −3V, −1V, +1V, and +3V as first through fourth amplitude levels, respectively. Further, the first through ninth reference offset voltage levels REF_1-REF_BOT_2 have predetermined voltage levels. The first, second, fifth, and eighth reference offset voltage levels REF_1, REF_2, REF_MID_1, and REF_MID_2 are 0V. The third reference offset voltage level REF_AUX is less than −3V. The fourth and seventh reference offset voltage levels REF_TOP_1 and REF_TOP_2 are +2V. The sixth and eighth reference offset voltage levels REF_BOT_1 and REF_BOT_2 are −2V.

The first sampler 108 compares an amplitude level of the second data signal SECOND_DATA with the first reference offset voltage level REF_1. When the amplitude level of the second data signal SECOND_DATA is greater than the first reference offset voltage level REF_1, the first sampler 108 samples the second data signal SECOND_DATA at the rising edge of the first clock signal CLK1 and generates the first intermediate signal E1 at high logic state. When the amplitude level of the second data signal SECOND_DATA is less than the first reference offset voltage level REF_1, the first sampler 108 generates the first intermediate signal E1 at low logic state.

The second sampler 110 compares the amplitude level of the second data signal SECOND_DATA with the second reference offset voltage level REF_2. When the amplitude level of the second data signal SECOND_DATA is greater than the second reference offset voltage level REF_2, the second sampler 110 samples the second data signal SECOND_DATA at the rising edge of the third clock signal CLK3 and generates the second intermediate signal E2 at high logic state. When the amplitude level of the second data signal SECOND_DATA is less than the second reference offset voltage level REF_2, the second sampler 110 generates the second intermediate signal E2 at low logic state. The first and third clock signals CLK1 and CLK3 have a phase difference of 180 degrees between them. Thus, the first and second samplers 108 and 110 sample the second data signal SECOND_DATA at the rising and falling edges of the first clock signal CLK1. In a locked state of the CDR circuit 100A, the first and second samplers 108 and 110 generate the first and second intermediate signals E1 and E2, and correspond to the transitions in the amplitude level of the second data signal SECOND_DATA at the rising and falling edges of the first clock signal CLK1, respectively.

The mux 102 receives the second and fourth clock signals CLK2 and CLK4, and the select signal SEL, and outputs one of the second and fourth clock signals CLK2 and CLK4 based on the select signal SEL. When the select signal SEL is at a first logic state, the mux 102 outputs the second clock signal CLK2. When the select signal SEL is at a second logic state, the mux 102 outputs the fourth clock signal CLK4. For example, when the select signal SEL is at low logic state, the mux 102 outputs the second clock signal CLK2. When the select signal SEL is at high logic state, the mux 102 outputs the fourth clock signal CLK4. The second and fourth clock signals CLK2 and CLK4 have a phase difference of 180 degrees between them.

The offset voltage generator 134 uses the third sampler 112 and the level finding circuit 128 to alternately generate and update the fourth through ninth reference offset voltage levels REF_TOP_1-REF_BOT_2 for the fourth through ninth samplers 114-124, respectively, that receive the second and fourth clock signals CLK2 and CLK4. When the select signal SEL is at the first logic state, the offset voltage generator 134 generates the fourth through sixth reference offset voltage levels REF_TOP_1, REF_MID_1 and REF_BOT_1, and holds the seventh through ninth reference offset voltage levels REF_TOP_2, REF_MID_2, and REF_BOT_2 at their previously generated levels. When the select signal SEL is at the second logic state, the offset voltage generator 134 generates the seventh through ninth reference offset voltage levels REF_TOP_2, REF_MID_2, and REF_BOT_2, and holds the fourth through sixth reference offset voltage levels REF_TOP_1, REF_MID_1, and REF_BOT_1 at their previously generated levels. The third sampler 112 is thus time-shared for generation of the fourth through sixth reference offset voltage levels REF_TOP_1, REF_MID_1, and REF_BOT_1, and the seventh through ninth reference offset voltage levels REF_TOP_2, REF_MID_2, and REF_BOT_2. In another embodiment, a tenth sampler (not shown) may be present and the third sampler 112 may receive the second clock signal CLK2 all the time and the tenth sampler may receive the fourth clock signal CLK4 all the time.

In an embodiment, the select signal SEL is at the first logic state and the mux 102 outputs the second clock signal CLK2. The third sampler 112 compares the amplitude level of the second data signal SECOND_DATA with the third reference offset voltage level REF_AUX. When the amplitude level of the second data signal SECOND_DATA is greater than the third reference offset voltage level REF_AUX, the third sampler 112 samples the second data signal SECOND_DATA at the rising edge of the second clock signal CLK2 and generates the third intermediate signal DATA_AUX at high logic state. When the amplitude level of the second data signal SECOND_DATA is less than the third reference offset voltage level REF_AUX, the third sampler 112 generates the third intermediate signal DATA_AUX at low logic state. In another embodiment, the select signal SEL is at the second logic state and the mux 102 generates the fourth clock signal CLK4. When the amplitude level of the second data signal SECOND_DATA is greater than the third reference offset voltage level REF_AUX, the third sampler 112 samples the second data signal SECOND_DATA at the rising edge of the fourth clock signal CLK4 and generates the third intermediate signal DATA_AUX at high logic state. When the amplitude level of the second data signal SECOND_DATA is less than the third reference offset voltage level REF_AUX, the third sampler 112 generates the third intermediate signal DATA_AUX at low logic state.

The fourth sampler 114 compares the amplitude level of the second data signal SECOND_DATA with the fourth reference offset voltage level REF_TOP_1. When the amplitude level of the second data signal SECOND_DATA is greater than the fourth reference offset voltage level REF_TOP_1, the fourth sampler 114 samples the second data signal SECOND_DATA at the rising edge of the second clock signal CLK2 and generates the fourth intermediate signal DATA1_TOP at high logic state. When the amplitude level of the second data signal SECOND_DATA is less than the fourth reference offset voltage level REF_TOP_1, the fourth sampler 114 generates the fourth intermediate signal DATA1_TOP at low logic state.

The fifth sampler 116 compares the amplitude level of the second data signal SECOND_DATA with the fifth reference offset voltage level REF_MID_1. When the amplitude level of the second data signal SECOND_DATA is greater than the fifth reference offset voltage level REF_MID_1, the fifth sampler 116 samples the second data signal SECOND_DATA at the rising edge of the second clock signal CLK2 and generates the fifth intermediate signal DATA1_MID at high logic state. When the amplitude level of the second data signal SECOND_DATA is less than the fifth reference offset voltage level REF_MID_1, the fifth sampler 116 generates the fifth intermediate signal DATA1_MID at low logic state.

The sixth sampler 118 compares the amplitude level of the second data signal SECOND_DATA with the sixth reference offset voltage level REF_BOT_1. When the amplitude level of the second data signal SECOND_DATA is greater than the sixth reference offset voltage level REF_BOT_1, the sixth sampler 118 samples the second data signal SECOND_DATA at the rising edge of the second clock signal CLK2 and generates the sixth intermediate signal DATA1_BOT at high logic state. When the amplitude level of the second data signal SECOND_DATA is less than the sixth reference offset voltage level REF_BOT_1, the sixth sampler 118 generates the sixth intermediate signal DATA1_BOT at low logic state.

In an example, the amplitude level of the second data signal SECOND_DATA is +1V. Thus, the fourth sampler 114 generates the fourth intermediate signal DATA1_TOP at low logic state, the fifth sampler 116 generates the fifth intermediate signal DATA1_MID at high logic state, and the sixth sampler 118 generates the sixth intermediate signal DATA1_BOT at high logic state.

In another example, the second data signal SECOND_DATA is at −1V. Thus, the fourth and fifth samplers 114 and 116 generate the fourth and fifth intermediate signals DATA1_TOP and DATA1_MID at low logic state, and the sixth sampler 118 generates the sixth intermediate signal DATA1_BOT at high logic state.

The seventh sampler 120 compares the amplitude level of the second data signal SECOND_DATA with the seventh reference offset voltage level REF_TOP_2. When the amplitude level of the second data signal SECOND_DATA is greater than the seventh reference offset voltage level REF_TOP_2, the seventh sampler 120 samples the second data signal SECOND_DATA at the rising edge of the fourth clock signal CLK4 and generates the seventh intermediate signal DATA2_TOP at high logic state. When the amplitude level of the second data signal SECOND_DATA is less than the seventh reference offset voltage level REF_TOP_2, the seventh sampler 120 generates the seventh intermediate signal DATA2_TOP at low logic state.

The eighth sampler 122 compares the amplitude level of the second data signal SECOND_DATA with the eighth reference offset voltage level REF_MID_2. When the amplitude level of the second data signal SECOND_DATA is greater than the eighth reference offset voltage level REF_MID_2, the eighth sampler 122 samples the second data signal SECOND_DATA at the rising edge of the fourth clock signal CLK4 and generates the eighth intermediate signal DATA2_MID at high logic state. When the amplitude level of the second data signal SECOND_DATA is less than the eighth reference offset voltage level REF_MID_2, the eighth sampler 122 generates the eighth intermediate signal DATA2_MID at low logic state.

The ninth sampler 124 compares the amplitude level of the second data signal SECOND_DATA with the ninth reference offset voltage level REF_BOT_2. When the amplitude level of the second data signal SECOND_DATA is greater than the ninth reference offset voltage level REF_BOT_2, the ninth sampler 124 samples the second data signal SECOND_DATA at the rising edge of the fourth clock signal CLK4 and generates the ninth intermediate signal DATA2_BOT at high logic state. When the amplitude level of the second data signal SECOND_DATA is less than the ninth reference offset voltage level REF_BOT_2, the ninth sampler 124 generates the ninth intermediate signal DATA2_BOT at low logic state.

In an example, the amplitude level of the second data signal SECOND_DATA is +1V. Thus, the seventh sampler 120 generates the seventh intermediate signal DATA2_TOP at low logic state, the eighth and ninth samplers 122 and 124 generate the eighth and ninth intermediate signals DATA2_MID and DATA2_BOT, respectively, at high logic state. In another example, the amplitude level of the second data signal SECOND_DATA is −1V. Thus, the seventh and eighth samplers 120 and 122 generate the seventh and eighth intermediate signals DATA2_TOP and DATA2_MID at low logic state, and the ninth sampler 124 generates the ninth intermediate signal DATA2_BOT at high logic state.

The clock recovery circuit 126 receives the first, second, fifth, and eighth intermediate signals, E1, E2, DATA1_MID, and DATA2_MID, and generates the first through fourth clock signals CLK1-CLK4. The first through fourth clock signals CLK1-CLK4 have a bit-rate that is half of the bit-rate of the second data signal SECOND_DATA. The level finding circuit 128 receives the third intermediate signal DATA_AUX, and generates the third reference offset voltage level REF_AUX and the band level signal.

The VGA adaptation circuit 130 receives the band level signal and generates the first control signal VGA_CODE. The VGA adaptation circuit 130 varies the value of the first control signal VGA_CODE based on the band level signal. The variation of the value of the first control signal VGA_CODE is an iterative process. In one example, the VGA adaptation circuit 130 performs a sweep over multiple values of the first control signal VGA_CODE that are present in a first set of values. Each value in the first set of values corresponds to a gain of the VGA 104 based on which the VGA 104 amplifies the first data signal FIRST_DATA. Table 1, as shown below, illustrates the first set of values and the corresponding gains.

TABLE 1

First set of values and corresponding gain

| First control signal value | | | | | | | | | | | |
|---|---|---|---|---|---|---|---|---|---|---|---|
| | 0 | 1 | 2 | 3 | 4 | 5 | 6 | 7 | 8 | 9 | 10 |
| Gain (dB) | 0.5 | 1.2 | 2 | 2.9 | 3.7 | 4.1 | 4.5 | 4.8 | 5.1 | 5.4 | 5.7 |

It will be apparent to a person skilled in the art that Table 1 illustrates an example of the first set of values. In another embodiment, the first set of values may include different values and correspond to different gains as illustrated by the Table 1.

The CTLE adaptation circuit 132 receives the band level signal and generates the second control signal CTLE_CODE. The CTLE adaptation circuit 132 varies the value of the second control signal CTLE_CODE based on the band level signal. The variation of the value of the second control signal CTLE_CODE is an iterative process. In one example, the CTLE adaptation circuit 132 performs a sweep across multiple values of the second control signal CTLE_CODE that are present in a second set of values. Each value in the second set of values corresponds to a gain of the CTLE 106 based on which the CTLE 106 adjusts the bandwidth of the intermediate first data signal.

The offset voltage generator 134 receives the band level signal and generates one of the fourth and seventh reference offset voltage levels REF_TOP_1 and REF_TOP_2, one of the fifth and eighth reference offset voltage levels REF_MID_1 and REF_MID_2, and one of the sixth and ninth reference offset voltage levels REF_BOT_1 and REF_BOT_2.

In an embodiment, when the select signal SEL is at the first logic state and the fourth through sixth samplers 114-118 are operational, the data recovery circuit 136 detects the first through fourth amplitude levels of the second data signal SECOND_DATA based on the fourth through sixth intermediate signals DATA1_TOP-DATA1_BOT. When the fourth through sixth intermediate signals DATA1_TOP-DATA1_BOT are at low logic state, the data recovery circuit 136 detects that the second data signal SECOND_DATA has the first amplitude level (−3V). When the fourth and fifth intermediate signals DATA1_TOP and DATA1_MID are at low logic states and the sixth intermediate signal DATA1_BOT is at high logic state, the data recovery circuit 136 detects that the second data signal SECOND_DATA has the second amplitude level (−1V). When the fourth intermediate signal DATA1_TOP is at low logic state, and the fifth and sixth intermediate signals DATA1_MID and DATA1_BOT are at high logic states, the data recovery circuit 136 detects that the second data signal SECOND_DATA has the third amplitude level (+1V). When the fourth through sixth intermediate signals DATA1_TOP-DATA1_BOT are at high logic state, the data recovery circuit 136 detects that the second data signal SECOND_DATA has the fourth amplitude level (+3V). It will be apparent to a person skilled in the art that the data recovery circuit 136 detects the first through fourth amplitude levels of the second data signal SECOND_DATA in a similar manner when the select signal SEL is at the second logic state and the seventh through ninth samplers 120-124 are operational. The generation of the band level signal, the first control signal VGA_CODE, and the second control signal CTLE_CODE by the level finding circuit 128, the VGA adaptation circuit 130, and the CTLE adaptation circuit 132 is described in conjunction with FIG. 2B, FIGS. 3A-3C, and FIG. 4, respectively.

Figure 1B:
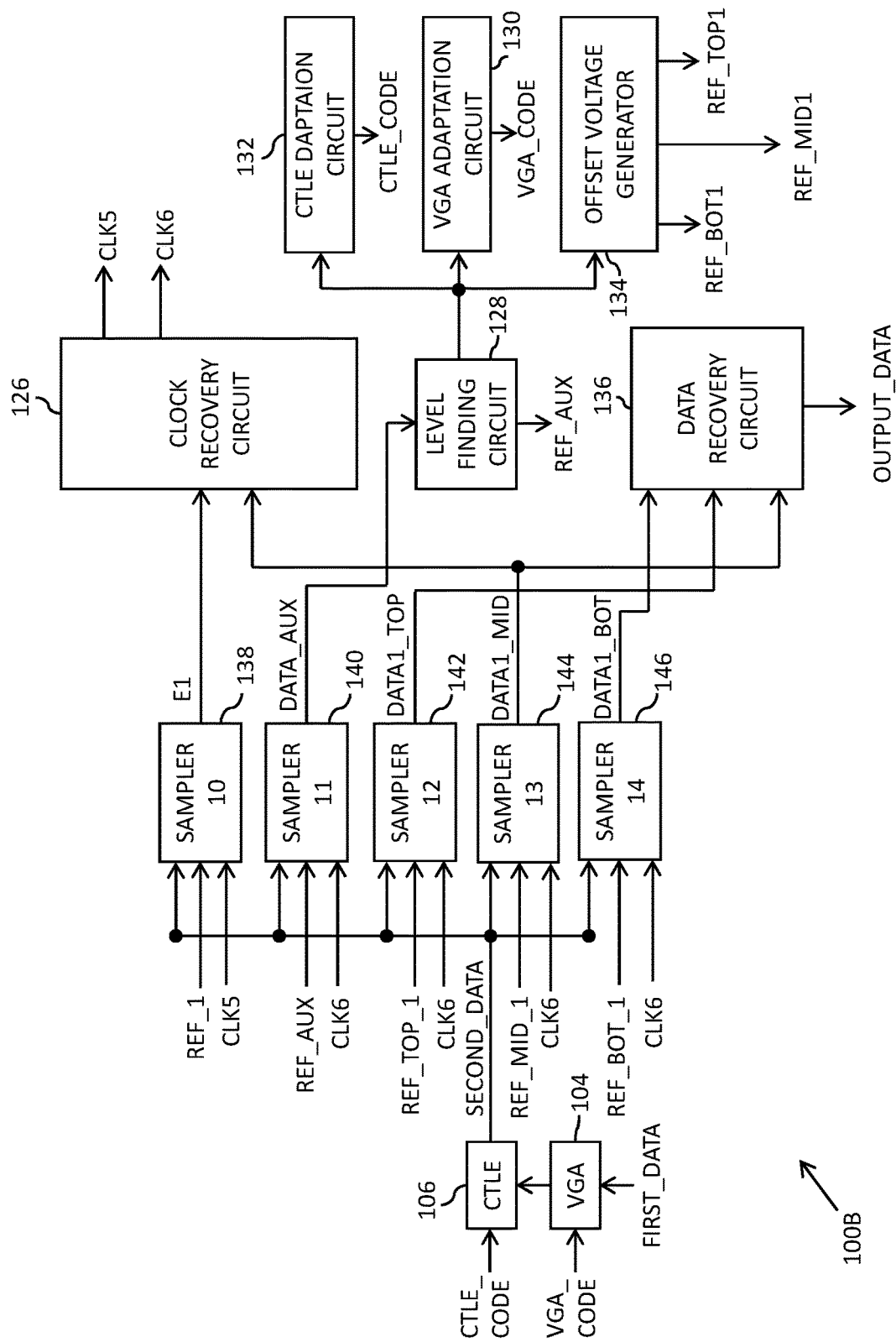
FIG. 1B is a block diagram of a CDR circuit in accordance with another embodiment of the present invention.

Referring now to FIG. 1B, a block diagram of a clock and data recovery (CDR) circuit 100B, in accordance with another embodiment of the present invention, is shown. The CDR circuit 100B is used in a data reception system (not shown) of a communication system (not shown). The CDR circuit 100B includes the VGA 104, the CTLE 106, the tenth through fourteenth samplers 138-146, the clock recovery circuit 126, the level finding circuit 128, the VGA adaptation circuit 130, the CTLE adaptation circuit 132, the offset voltage generator 134, and the data recovery circuit 136. The CDR circuit 100B generates fifth and sixth clock signals CLK5 and CLK6. The fifth and sixth clock signals CLK5 and CLK6 have same bit-rate as of the second data signal SECOND_DATA. Further, the fifth and sixth clock signals CLK5 and CLK6 have a predefined phase difference of 180 degrees. The fifth and sixth clock signals CLK5 and CLK6 correspond to the first and third clock signals CLK1 and CLK3, respectively. The tenth through fourteenth samplers 138-146 correspond to the first and third through sixth samplers 108 and 112-118, respectively. It will be understood by person skilled in the art that the tenth through fourteenth samplers 138-146 are structurally and functionally similar to the first and third through sixth samplers 108 and 112-118, respectively.

The eleventh sampler 140 is not time-shared and receives the sixth clock signal CLK6 all the time. The level finding circuit 128 generates the band level signal based on the third intermediate signal DATA_AUX that is generated corresponding to the sixth clock signal CLK6 only. Further, the offset voltage generator 134 generates the fourth through sixth reference offset voltage levels REF_TOP_1, REF_MID_1, and REF_BOT_1, only, based on the band level signal. The data recovery circuit 136 generates the output data signal based on the fourth through sixth intermediate signals DATA1_TOP-DATA1_BOT.

It will be understood by person skilled in the art that the operations executed by the VGA 104, the CTLE 106, the clock recovery circuit 126, the level finding circuit 128, the VGA adaptation circuit 130, the CTLE adaptation circuit 132, the offset voltage generator 134, and the data recovery circuit 136 of the CDR circuit 100B are similar to the VGA 104, the CTLE 106, the clock recovery circuit 126, the level finding circuit 128, the VGA adaptation circuit 130, the CTLE adaptation circuit 132, the offset voltage generator 134, and the data recovery circuit 136 of the CDR circuit 100A.

Referring now to FIG. 2A, an exemplary eye diagram 200 of the second data signal SECOND_DATA, in accordance with an embodiment of the present invention, is shown. The eye diagram 200 may be observed on an oscilloscope (not shown) by monitoring the second data signal SECOND_DATA. The eye diagram 200 represents a time domain representation of successive amplitude levels of the second data signal SECOND_DATA received over a period of time. The Y-axis of the eye diagram 200 represents amplitude level of the second data signal SECOND_DATA. For example, the amplitude levels of the second data signal SECOND_DATA are in the range of −3V to +3V. The eye diagram 200 includes first through eighth band levels B0-B7 and first through third data eyes having first through third eye heights H1-H3, respectively. The first through third data eyes are formed when the second data signal SECOND_DATA transitions from one amplitude level to another amplitude level of the first through fourth amplitude levels −3V, −1V, +1V, and +3V. The first through third data eyes represent the absence of the second data signal SECOND_DATA. Hence, the second data signal SECOND_DATA does not have the amplitude levels that correspond to the first through third data eyes. The first eye is formed by the second and third band levels B1 and B2. The second eye is formed by the fourth and fifth band levels B3 and B4. The third eye is formed by the sixth and seventh band levels B5 and B6. The band level signal includes information pertaining to the amplitude levels that corresponds to the first through eighth band levels B0-B7. A first dashed line 202 represents one of the fourth and seventh reference offset voltage levels REF_TOP_1 and REF_TOP_2. In one embodiment, the fourth and seventh reference offset voltage levels REF_TOP_1 and REF_TOP_2 have a value of +2V represented at the Y-axis of the eye diagram 200. A second dashed line 204 represents one of the fifth and eighth reference offset voltage levels REF_MID_1 and REF_MID_2. In one embodiment, the fifth and eighth reference offset voltage levels REF_MID_1 and REF_MID_2 have a value of 0V represented at the Y-axis of the eye diagram 200. A third dashed line 206 represents one of the sixth and ninth reference offset voltage levels REF_BOT_1 and REF_BOT_2. In one embodiment, the sixth and ninth reference offset voltage levels REF_BOT_1 and REF_BOT_2 have a value of −2V represented at the Y-axis of the eye diagram 200.

Figure 2B:
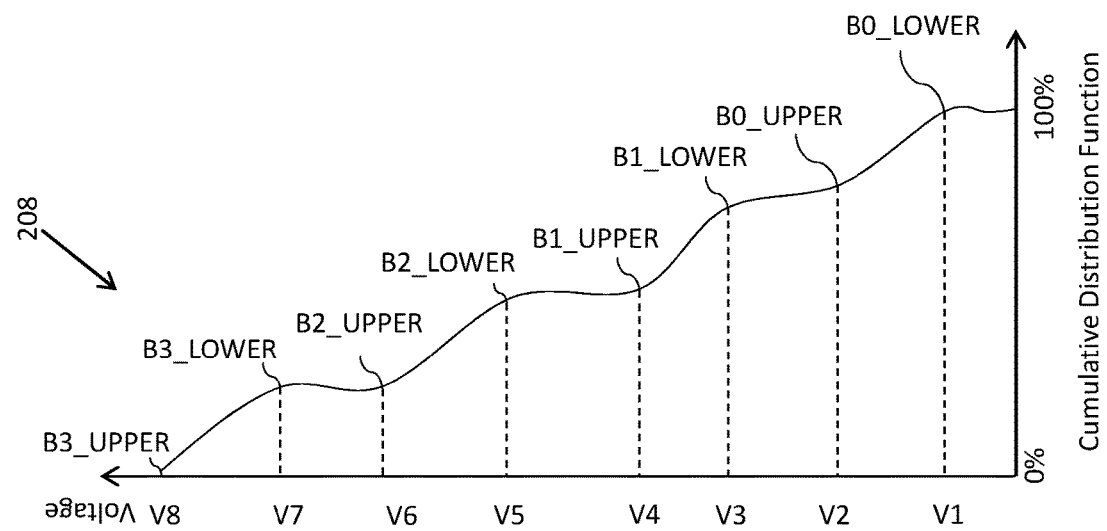
FIG. 2B is a plot of a cumulative distribution function (CDF) based on amplitude levels of a data signal at a sampling time in accordance with an embodiment of the present invention.
Figure 2A:
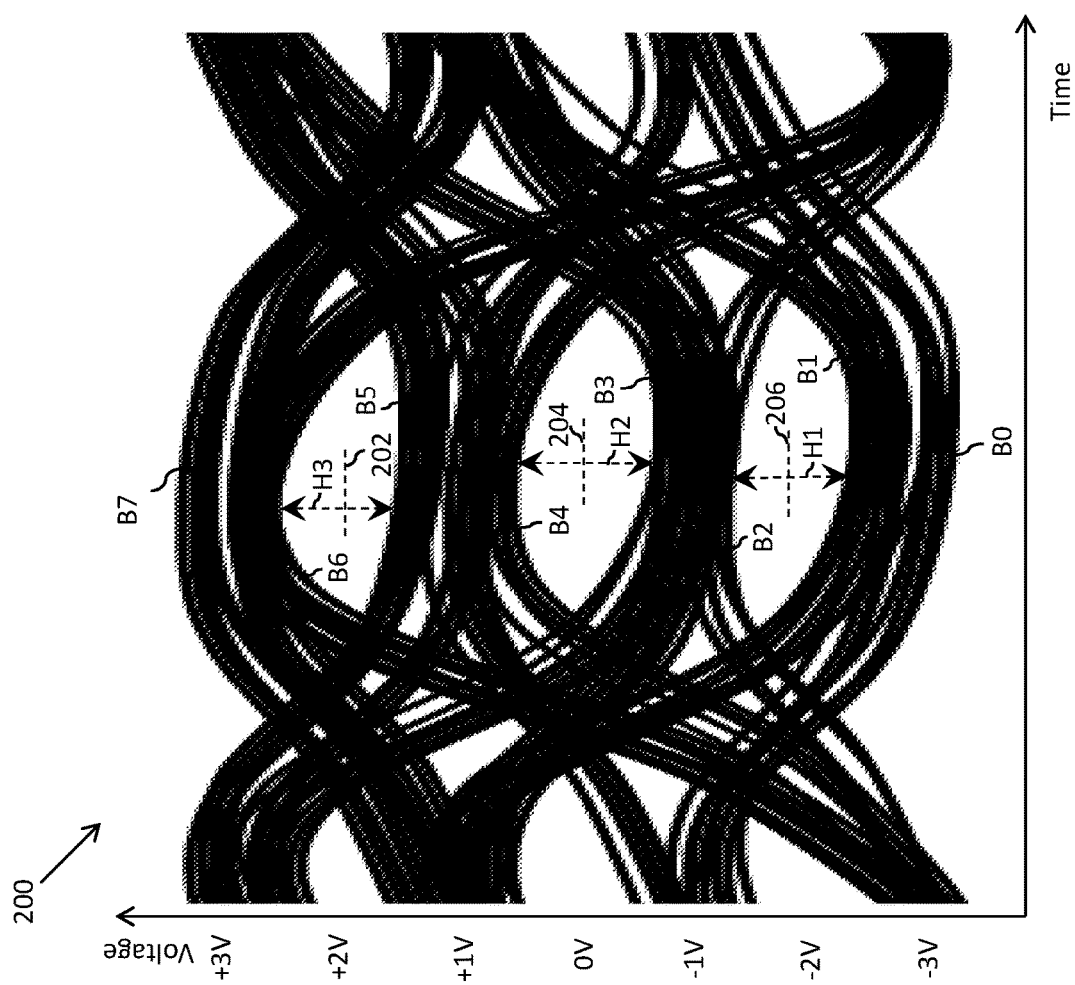
FIG. 2A is an exemplary eye diagram of a data signal in accordance with an embodiment of the present invention.

Referring now to FIG. 2B, a plot of a cumulative distribution function (CDF) 208 based on the amplitude levels of the second data signal SECOND_DATA at a sampling time, in accordance with an embodiment of the present invention, is shown.

The level finding circuit 128 determines the CDF 208 based on the amplitude levels of the second data signal SECOND_DATA. In one embodiment, for determining the CDF 208, the level finding circuit 128 varies the third reference offset voltage level REF_AUX from a low amplitude level to a high amplitude level, i.e., a predefined amplitude range, over a period of time. For varying the third reference offset voltage level REF_AUX from a low amplitude level to a high amplitude level, the level finding circuit 128 sets the third reference offset voltage level REF_AUX at an initial amplitude level. When the third reference offset voltage level REF_AUX is set at the initial amplitude level, the third sampler 112 samples the second data signal SECOND_DATA for a predefined number of times. In one example, the level finding circuit 128 sets the third reference offset voltage level REF_AUX at the initial amplitude level of −3.5V for a predefined time interval and the third sampler 112 samples the second data signal SECOND_DATA for 1,000 times during a first predefined time interval, when the third reference offset voltage level REF_AUX is set at −3.5V. Since the third reference offset voltage level REF_AUX is lower than the lowest amplitude level, i.e., the first amplitude level −3V, of the second data signal SECOND_DATA, the third sampler 112 generates the third intermediate signal DATA_AUX at high logic state for 1,000 times, i.e., a count value. The level finding circuit 128 stores the number of high logic states, i.e., the count value, of the third intermediate signal DATA_AUX as 1,000, when the third reference offset voltage level REF_AUX is set at −3.5V. The level finding circuit 128 then determines a percentage of times the third sampler 112 generates the third intermediate signal DATA_AUX at high logic state, when the third reference offset voltage level REF_AUX is set at −3.5V. The data finding circuit 128 then plots the percentage at Y-axis of the CDF 208 corresponding to the third reference offset voltage level REF_AUX plotted at the X-axis of the CDF 208. For example, corresponding to the third reference offset voltage level REF_AUX of −3.5V at the X-axis of the CDF 208, the Y-axis of the CDF 208 has the value 100% or 1. The level finding circuit 128 further increases the third reference offset voltage level REF_AUX, sets it at multiple values, and repeats the aforementioned process. The level finding circuit 128 determines, i.e., multiple count values, the number of high logic states of the third intermediate signal DATA_AUX, corresponding to the multiple values of the third reference offset voltage level REF_AUX and plots the CDF 208.

In another example, the level finding circuit 128 sets the third reference offset voltage level REF_AUX at the initial amplitude level of +3.5V and decreases the third reference offset voltage level REF_AUX to set it at multiple values, and repeats the aforementioned process. In another embodiment, the level finding circuit 128 generates the band level signal based on the third intermediate signal DATA_AUX received from the eleventh sampler 140.

When the third reference offset voltage level REF_AUX is set at a value that corresponds to a voltage level where one of the first through third eyes of the eye diagram 200 occurs, the CDF 208 includes flat regions. Hence, the flat regions in the CDF 208 represent the first through third eyes of the eye diagram 200 and indicate that there is no change in the number of high logic states of the third intermediate signal DATA_AUX. Conversely, when the third reference offset voltage REF_AUX is set at a value that do not correspond to a voltage level where one of the first through third eyes occurs, the CDF 208 includes transition (sloping) regions. The transition (sloping) regions represent the presence of the second data signal SECOND_DATA and indicate a change in the number of high logic states of the third intermediate signal DATA_AUX.

The level finding circuit 128 then uses the CDF 208 to generate the band level signal. Alternatively stated, the level finding circuit 128 uses the multiple count values to generate the band level signal. The level finding circuit 128 identifies the termination points of the flat regions and the transition (sloping) regions from the CDF 208. The termination points of the flat regions are B0_LOWER, B1_LOWER, B2_LOWER, and B3_LOWER, and the termination points of the transition (sloping) regions include B0_UPPER, B1_UPPER, B2_UPPER, and B3_UPPER. The termination points of the flat regions B0_LOWER, B1_LOWER, B2_LOWER, and B3_LOWER correspond to the first, third, fifth, and seventh band levels B0, B2, B4, and B6 of the eye diagram 200, respectively. The termination points of the transition (sloping) regions B0_UPPER, B1_UPPER, B2_UPPER, and B3_UPPER correspond to the second, fourth, sixth, and eighth band levels B1, B3, B5, and B7 of the eye diagram 200, respectively. The band level signal includes amplitude levels, such as V1, V3, V5, V7, V2, V4, V6, and V8, of the third reference offset voltage level REF_AUX that correspond to the termination points of the flat regions B0_LOWER, B1_LOWER, B2_LOWER, and B3_LOWER, and the termination points of the transition (sloping) regions B0_UPPER, B1_UPPER, B2_UPPER, and B3_UPPER, respectively.

In one embodiment, the offset voltage generator 134 generates one of the fourth and seventh reference offset voltage levels REF_TOP_1 and REF_TOP_2, one of the fifth and eighth reference offset voltage levels REF_MID_1 and REF_MID_2, and one of the sixth and ninth reference offset voltage levels REF_BOT_1 and REF_BOT_2 based on the band level signal. For example, the offset voltage generator 134 uses equations (1), (2), and (3), as shown below, for generating one of the fourth and seventh reference offset voltage levels REF_TOP_1 and REF_TOP_2, one of the fifth and eighth reference offset voltage levels REF_MID_1 and REF_MID_2, and one of the sixth and ninth reference offset voltage levels REF_BOT_1 and REF_BOT_2, respectively:

$$\text{REF\_TOP} = (V6+V7)/2 \qquad (1)$$

where, REF_TOP is one of the fourth and seventh reference offset voltage levels REF_TOP_1 and REF_TOP_2; V6 is the amplitude level corresponding to the termination point of the transition (sloping) region B2_UPPER; and V7 is the amplitude level corresponding to the termination point of the flat regions B3_LOWER.

$$\text{REF\_MID} = (V4+V5)/2 \qquad (2)$$

where, REF_MID is one of fifth and eighth reference offset voltage levels REF_MID_1 and REF_MID_2; V4 is the amplitude level corresponding to the termination point of the transition (sloping) region B1_UPPER; and V5 is the amplitude level corresponding to the termination point of the flat regions B2_LOWER.

$$\text{REF\_BOT} = (V2+V3)/2 \qquad (3)$$

where, REF_BOT is one of the sixth and ninth reference offset voltage levels REF_BOT_1 and REF_BOT_2; V2 is the amplitude level corresponding to the termination point of the transition (sloping) region B0_UPPER; and V3 is the amplitude level corresponding to the termination point of the flat regions B1_LOWER.

In another embodiment, the band level signal further includes information pertaining to a first temporary offset voltage level REF_TEMP1, a second temporary offset voltage level REF_TEMP2, a third temporary offset voltage level REF_TEMP3, and a fourth temporary offset voltage level REF_TEMP4. For determining the first temporary offset voltage level REF_TEMP1, the level finding circuit 128 sets the third reference offset voltage level REF_AUX at −3.5V. The level finding circuit 128 then continues to increase the amplitude level of the third reference offset voltage level REF_AUX till the number of high logic states, i.e., the count value, of the third intermediate signal DATA_AUX is 750 (or 75% of the total number of samples). When the level finding circuit 128 obtains 750 high logic states, it stores the corresponding third reference offset voltage level REF_AUX as the first temporary offset voltage level REF_TEMP1. For determining the second temporary offset voltage level REF_TEMP2, the level finding circuit 128 sets the third reference offset voltage level REF_AUX at 0V. The level finding circuit 128 then continues to reduce the amplitude level of the third reference offset voltage level REF_AUX till the number of high logic states of the third intermediate signal is 750. When the level finding circuit 128 obtains 750 high logic states, i.e., the count value, it stores the corresponding third reference offset voltage level REF_AUX as the second temporary offset voltage level REF_TEMP2. The offset voltage generator 134 receives the band level signal and then determines an average of the first and second temporary offset voltage levels REF_TEMP1 and REF_TEMP2 to generate one of the sixth and ninth reference offset voltage levels REF_BOT_1 and REF_BOT_2. Typically, the average of the first and second temporary offset voltage levels REF_TEMP1 and REF_TEMP2 is −2V.

Further, the aforementioned process is executed to determine the fourth and seventh reference offset voltage levels REF_TOP_1 and REF_TOP_2. For determining the third temporary offset voltage level REF_TEMP3, the level finding circuit 128 sets the third reference offset voltage level REF_AUX at +3.5V. The level finding circuit 128 then continues to decrease the value of the third reference offset voltage level REF_AUX till the number of high logic states of the third intermediate signal is 250 (or 25% of the total number of samples). When the level finding circuit 128 obtains 250 high logic states, it stores the corresponding third reference offset voltage level REF_AUX as the third temporary offset voltage level REF_TEMP3. For determining the fourth temporary offset voltage level REF_TEMP4, the level finding circuit 128 sets the third reference offset voltage level REF_AUX at 0V. The level finding circuit 128 then continues to increases the value of the third reference offset voltage level REF_AUX till the number of high logic states of the third intermediate signal is 250. When the level finding circuit 128 obtains 250 high logic states, it stores the corresponding third reference offset voltage level REF_AUX as a fourth temporary offset voltage level REF_TEMP4. The offset voltage generator 134 receives the band level signal and then determines an average of the third and fourth temporary offset voltage levels REF_TEMP3 and REF_TEMP4 to generate at least one of the fourth and seventh reference offset voltage levels REF_TOP_1 and REF_TOP_2. Typically, the average of the third and fourth temporary offset voltage levels REF_TEMP3 and REF_TEMP4 is +2V.

In an embodiment, the offset voltage generator 134 adjusts and generates the fourth through ninth reference offset voltage levels REF_TOP_1, REF_MID_1, REF_BOT_1, REF_TOP_2, REF_MID_2, and REF_BOT_2 as a weighted sum of previously generated fourth through ninth reference offset voltage levels REF_TOP_1, REF_MID_1, REF_BOT_1, REF_TOP_2, REF_MID_2, and REF_BOT_2, respectively, to prevent sudden increment or decrement in the fourth through ninth reference offset voltage levels REF_TOP_1, REF_MID_1, REF_BOT_1, REF_TOP_2, REF_MID_2, and REF_BOT_2. Further, the offset voltage generator 134 adds a static offset value, for example 0.1V, to the fourth through ninth reference offset voltage levels REF_TOP_1, REF_MID_1, REF_BOT_1, REF_TOP_2, REF_MID_2, and REF_BOT_2.

Thus, the first through ninth reference offset voltage levels REF_1-REF_BOT_2 are determined independent of each other and hence are accurate. As a result, the difference in the amplitude levels of the second data signal SECOND_DATA is constant, and the CDR circuits 100A and 100B have reduced bit-error-rate (BER) in comparison to the conventional CDR circuits. Further, the CDR circuits 100A and 100B determine the amplitude levels of the second data signal SECOND_DATA without the requirement of any auxiliary signal, hence the CDR circuits 100A and 100B operate faster in comparison to the conventional CDR circuits.

Figure 3A:
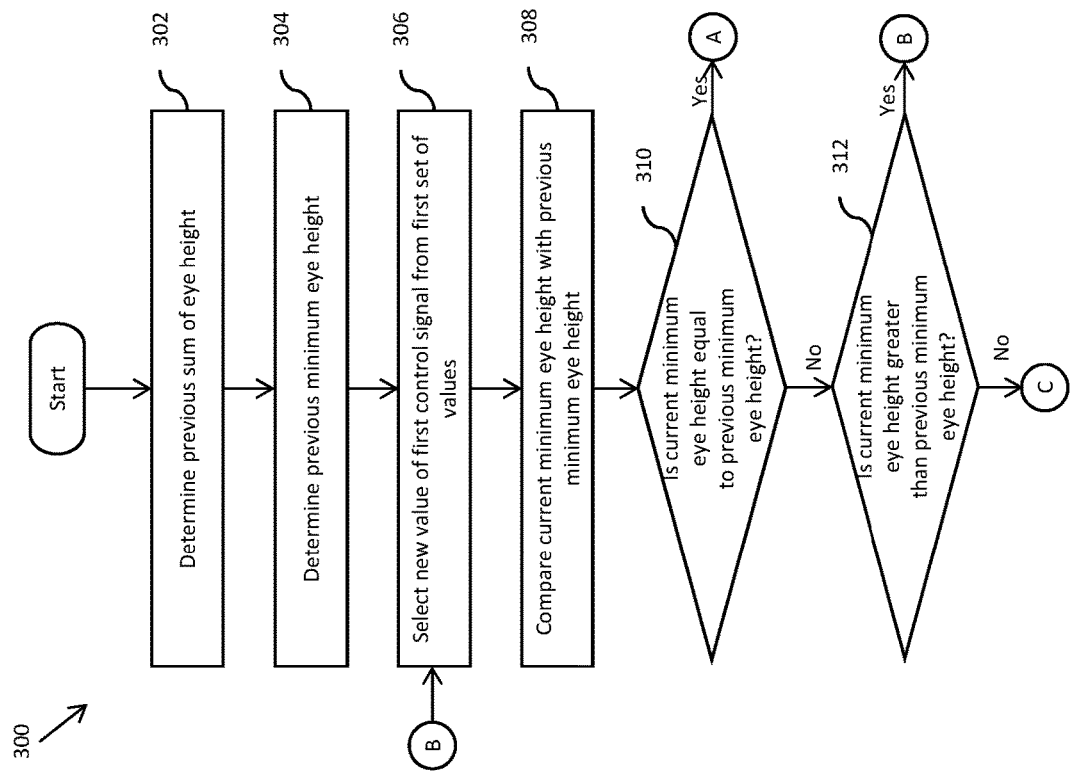
FIGS. 3A, 3B, and 3C collectively represent a flow chart that illustrates a method for generating a first control signal by using a variable gain amplifier (VGA) adaptation circuit of the CDR circuits of FIGS. 1A and 1B in accordance with an embodiment of the present invention.
Figure 3B:
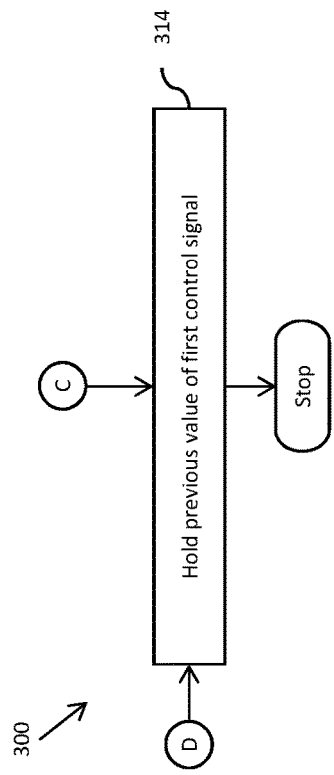
Figure 3C:
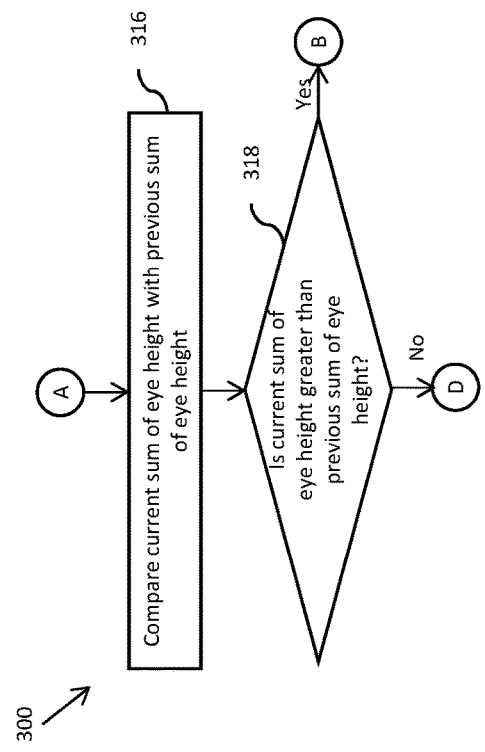

Referring now to FIGS. 3A, 3B, and 3C, a flow chart 300 that illustrates a method for generating the first control signal VGA_CODE by the VGA adaptation circuit 130 of the CDR circuits 100A and 100B of FIGS. 1A and 1B, in accordance with an embodiment of the present invention, is shown.

At step 302, the VGA adaptation circuit 130 determines a previous sum of eye height based on the band level signal that is generated corresponding to a previous value of the first control signal VGA_CODE. In an embodiment, a sum of eye height, i.e., a first feature value, represents a sum of third and first eye heights H3 and H1 of the eye diagram 200.

For example, the VGA adaptation circuit 130 determines the previous sum of eye height by using equation (4), as illustrated below:

$$\text{Sum of eye height} = (V7-V6)+(V3-V2) \qquad (4)$$

where, V7 is the amplitude level corresponding to the termination point of the flat regions B3_LOWER; V6 is the amplitude level corresponding to the termination point of the transition (sloping) region B2_UPPER; V3 is the amplitude level corresponding to the termination point of the flat regions B1_LOWER; and V2 is the amplitude level corresponding to the termination point of the transition (sloping) region B0_UPPER.

At step 304, the VGA adaptation circuit 130 determines a previous minimum eye height based on the band level signal that is generated corresponding to the previous value of the first control signal VGA_CODE. In an embodiment, a minimum eye height, i.e., a second feature value, represents one of the third and first eye heights H3 and H1 of the eye diagram 200, which is minimum. For example, the VGA adaptation circuit 130 determines the minimum eye height by using equation (5), as illustrated below:

$$\text{Minimum eye height} = \min((V7-V6),(V3-V2)) \qquad (5)$$

where, V7 is the amplitude level corresponding to the termination point of the flat regions B3_LOWER; V6 is the amplitude level corresponding to the termination point of the transition (sloping) region B2_UPPER; V3 is the amplitude level corresponding to the termination point of the flat regions B1_LOWER; and V2 is the amplitude level corresponding to the termination point of the transition (sloping) region B0_UPPER.

At step 306, the VGA adaptation circuit 130 selects a new value of the first control signal VGA_CODE from the first set of values, as illustrated in Table 1. In an embodiment, for improving the speed, the VGA adaptation circuit 130 selects the new value of the first control signal VGA_CODE, such that the new value is adjacent to the previous value in the first set of values. The gain of the VGA 104 is adjusted based on the new value of the first control signal VGA_CODE and hence, the level finding circuit 128 generates the band level signal corresponding to the new value of the first control signal VGA_CODE. The VGA adaptation circuit 130 uses equations (4) and (5) to determine a current sum of eye height and a current minimum eye height based on the band level signal that is generated corresponding to the new value of the first control signal VGA_CODE.

At step 308, the VGA adaptation circuit 130 compares the current minimum eye height with the previous minimum eye height. At step 310, the VGA adaptation circuit 130 determines whether the current minimum eye height is equal to the previous minimum eye height. If at step 310, it is determined that the current minimum eye height is not equal to the previous minimum eye height, step 312 is executed. At step 312, the VGA adaptation circuit 130 determines whether the current minimum eye height is greater than the previous minimum eye height. If at step 312, it is determined that the current minimum eye height is greater than the previous minimum eye height, step 306 is executed.

If at step 312, it is determined that the minimum eye height is lesser than the previous value of the minimum eye height, step 314 is executed. At step 314, the VGA adaptation circuit 130 holds the previous value of the first control signal VGA_CODE for a second predefined interval of time. In this scenario, the previous value of the first control signal VGA_CODE corresponds to an optimum value of the first control signal VGA_CODE. After the second predefined interval of time, the VGA adaptation circuit 130 repeats the aforementioned process.

If at step 310, it is determined that the current minimum eye height is equal to the previous minimum eye height, step 316 is executed. At step 316, the VGA adaptation circuit 130 compares the current sum of eye height with the previous sum of eye height. At step 318, the VGA adaptation circuit 130 determines whether the current sum of eye height is greater than the previous sum of eye height. If at step 318, it is determined that the current sum of eye height is greater than the previous sum of eye height, step 306 is executed. If at step 318, it is determined that the current sum of eye height is lesser than the previous sum of eye height, step 314 is executed.

In an embodiment, the VGA adaptation circuit 130 varies the value of the first control signal VGA_CODE to adjust the gain of the VGA 104. In an embodiment, the VGA adaptation circuit 130 varies the value of the first control signal VGA_CODE such that only one bit of the value of the first control signal VGA_CODE changes at one time.

Figure 4:
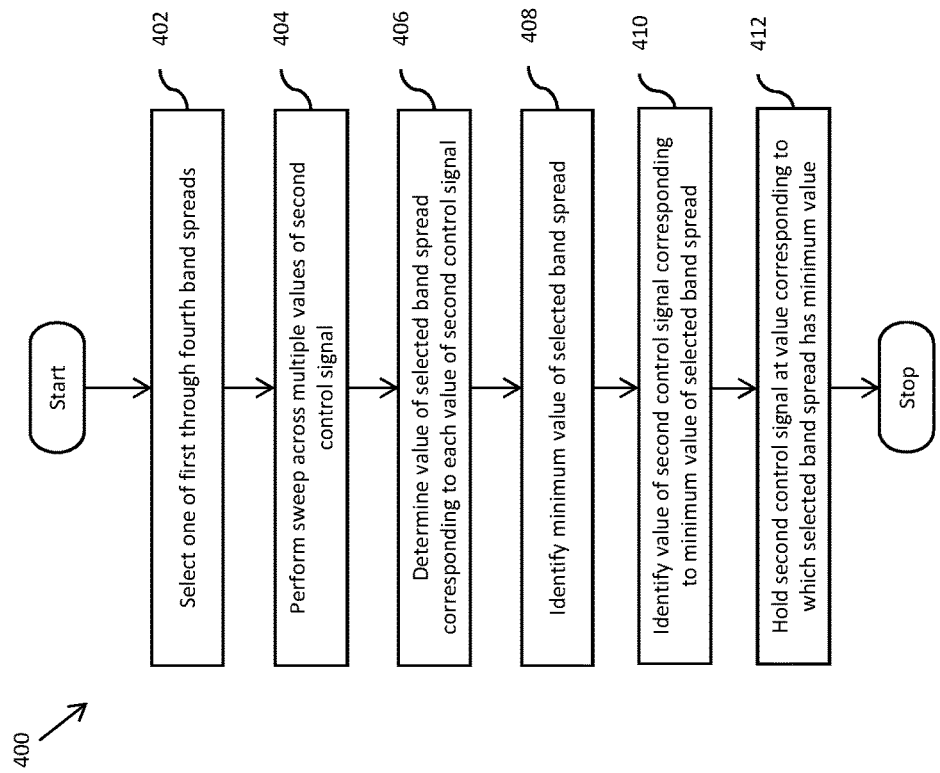
FIG. 4 is a flow chart that illustrates a method for generating a second control signal by using a continuous linear equalizer (CTLE) adaptation circuit of the CDR circuits of FIGS. 1A and 1B in accordance with an embodiment of the present invention.

Referring now to FIG. 4, a flow chart 400 that illustrates a method for generating the second control signal CTLE_CODE by the CTLE adaptation circuit 132 of the CDR circuits 100A and 100B of FIGS. 1A and 1B, in accordance with an embodiment of the present invention, is shown.

At step 402, the CTLE adaptation circuit 132 selects one of first through fourth band spreads BAND0_SPREAD, BAND1_SPREAD, BAND2_SPREAD, and BAND3_SPREAD. In one example, the CTLE adaptation circuit 132 selects the first band spread BAND0_SPREAD. In an embodiment, the first band spread BAND0_SPREAD represents region between the first and second band levels B0 and B1 of the eye diagram 200, where the second data signal SECOND_DATA is present. The second band spread BAND1_SPREAD represents region between the third and fourth band levels B2 and B3 of the eye diagram 200, where the second data signal SECOND_DATA is present. The third band spread BAND2_SPREAD represents region between the fifth and sixth band levels B4 and B5 of the eye diagram 200, where the second data signal SECOND_DATA is present. The fourth band spread BAND3_SPREAD represents region between the seventh and eighth band levels B6 and B7 of the eye diagram 200, where the second data signal SECOND_DATA is present.

At step 404, the CTLE adaptation circuit 132 performs a sweep across multiple values of the second control signal CTLE_CODE that are present in the second set of values. The CTLE adaptation circuit 132 varies the second control signal CTLE_CODE by performing the sweep to adjust the gain of the CTLE 106. Variation in the value of the second control signal CTLE_CODE varies the gain of the CTLE 106, which in turn further modifies the second data signal SECOND_DATA and the band level signal.

At step 406, the CTLE adaptation circuit 132 determines a value of the selected band spread, i.e., a third feature value, based on the band level signal that is generated corresponding to each value of the second control signal CTLE_CODE. For example, the CTLE adaptation circuit 132 determines the values of the selected band spread, i.e., one of the first through fourth band spreads BAND0_SPREAD, BAND1_SPREAD, BAND2_SPREAD, and BAND3_SPREAD, by using one of equations (6), (7), (8), and (9), as illustrated below:

$$BAND0\_SPREAD = (V8 - V7) \quad (6)$$

where, BAND0_SPREAD is the first band spread; V8 is the amplitude level corresponding to the termination point of the transition (sloping) region B3_UPPER; and V7 is the amplitude level corresponding to the termination point of the flat regions B3_LOWER.

$$BAND1\_SPREAD = (V6 - V5) \quad (7)$$

where, BAND1_SPREAD is the second band spread; V6 is the amplitude level corresponding to the termination point of the transition (sloping) region B2_UPPER; and V5 is the amplitude level corresponding to the termination point of the flat regions B2_LOWER.

$$BAND2\_SPREAD = (V4 - V3) \quad (8)$$

where, BAND2_SPREAD is the third band spread; V4 is the amplitude level corresponding to the termination point of the transition (sloping) region B1_UPPER; and V3 is the amplitude level corresponding to the termination point of the flat regions B1_LOWER.

$$BAND3\_SPREAD = (V2 - V1) \quad (9)$$

where, BAND3_SPREAD is the fourth band spread; V2 is the amplitude level corresponding to the termination point of the transition (sloping) region B0_UPPER; and V1 is the amplitude level corresponding to the termination point of the flat regions B0_LOWER.

At step 408, the CTLE adaptation circuit 132 identifies a minimum value of the selected band spread. At step 410, the CTLE adaptation circuit 132 identifies the value of the second control signal CTLE_CODE corresponding to the minimum value the selected band spread. At step 412, the CTLE adaptation circuit 132 holds the second control signal CTLE_CODE at the value, corresponding to which the selected band spread has the minimum value, for a third predefined interval of time. The value of the second control signal CTLE_CODE corresponding to which the selected band spread has the minimum value corresponds to an optimum value for the second control signal CTLE_CODE. In an embodiment, after the third predefined interval of time the CTLE adaptation circuit 132 repeats the aforementioned process.

In an embodiment, the CTLE adaptation circuit 132 varies the second control signal CTLE_CODE such that only one bit of the second control signal CTLE_CODE changes at one time. In an embodiment, the CTLE adaptation circuit 132 varies the second control signal CTLE_CODE by selecting values of the second control signal CTLE_CODE that are adjacent to the previous value in the second set of values.

It will be understood by those of skill in the art that the same function may be performed by different arrangements of samplers. Therefore, variations in the arrangement of some of the samplers described above should not be considered to depart from the scope of the present invention. No element, act, or instruction used in the present application should be construed as critical or essential to the invention unless explicitly described as such. Further, the phrase "based on" is intended to mean "based, at least in part, on" unless explicitly stated otherwise.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A clock and data recovery (CDR) circuit, comprising:
    first through fifth samplers each having a first sampler input terminal for receiving a data signal, a clock input terminal for receiving one of first and second clock signals, a second sampler input terminal for receiving one of first through fifth reference offset voltage levels, and a sampler output terminal for generating first through fifth intermediate signals, respectively;
    a clock recovery circuit having first and second clock recovery input terminals connected to the sampler output terminals of the first and fourth samplers for receiving the first and fourth intermediate signals, respectively, and first and second clock recovery output terminals for generating the first and second clock signals, respectively;
    a level finding circuit having a level finding input terminal connected to the sampler output terminal of the second sampler for receiving the second intermediate signal, a first level finding output terminal for generating a band level signal, and a second level finding output terminal for generating the second reference offset voltage level, wherein the level finding circuit varies the second reference offset voltage level within a predefined amplitude range for generating the band level signal;
    an offset voltage generator having a first offset voltage input terminal connected to the first level finding output terminal of the level finding circuit for receiving the band level signal, and first through third offset voltage output terminals for generating the third through fifth reference offset voltage levels, respectively; and
    a data recovery circuit having first through third data recovery input terminals connected to the sampler output terminals of the third through fifth samplers for receiving the third through fifth intermediate signals, respectively, and a data recovery output terminal for generating an output data signal.

2. The CDR circuit of claim 1, wherein the level finding circuit is configured to:
    set the second reference offset voltage level at each amplitude level of a plurality of amplitude levels, sequentially, wherein the second reference offset voltage level is set at each amplitude level for a predefined time interval, and wherein each amplitude level is in the predefined amplitude range;
    determine a count value corresponding to each amplitude level based on the second intermediate signal, wherein the count value indicates a number of times the second intermediate signal has a first logic state during the predefined time interval, when the second reference offset voltage level is set at the corresponding amplitude level; and
    generate the band level signal based on the count value corresponding to each amplitude level.

3. The CDR circuit of claim 2, wherein the data signal is a pulse amplitude modulation-4 signal having first through fourth amplitude levels, and wherein the plurality of amplitude levels comprise at least the first through fourth amplitude levels.

4. The CDR circuit of claim 1, further comprising:
    a VGA adaptation circuit having VGA adaptation input terminal connected to the first level finding output terminal of the level finding circuit for receiving the band level signal and a VGA adaption output terminal for generating the first control signal; and
    a CTLE adaptation circuit having a first CTLE adaption input terminal connected to the first level finding output terminal of the level finding circuit for receiving the band level signal and a CTLE adaption output terminal for generating the second control signal.

5. The CDR circuit of claim 4, wherein the VGA adaptation circuit is configured to:
    set the first control signal at each of one or more values sequentially;
    determine first and second feature values corresponding to each of the one or more values of the first control signal based on the band level signal; and
    identify an optimum value of the first control signal from the one or more values based on the first and second feature values corresponding to each of the one or more values of the first control signal.

6. The CDR circuit of claim 4, wherein the CTLE adaptation circuit is configured to:
    set the second control signal at each of one or more values sequentially;
    determine a first feature value corresponding to each of the one or more values of the second control signal based on the band level signal; and
    identify an optimum value of the second control signal from the one or more values based on the first feature value corresponding to each of the one or more values of the second control signal.

7. The CDR circuit of claim 1, wherein the first through fifth samplers compare the data signal with the corresponding reference offset voltage level for generating the first through fifth intermediate signals, respectively.

8. The CDR circuit of claim 1, wherein the first and second clock signals have a first phase difference therebetween, wherein the first phase difference is 180 degrees, and wherein the first and second clock signals have a bit-rate that is equal to a bit-rate of the data signal.

9. The CDR circuit of claim 1, further comprising:
    sixth through ninth samplers each having a first sampler input terminal for receiving the data signal, a clock input terminal for receiving one of third and fourth clock signal, a second sampler input terminal for receiving one of sixth through ninth reference offset voltage levels, and a sampler output terminal for generating sixth through ninth intermediate signals, respectively, wherein the clock recovery circuit generates the third and fourth clock signals, wherein the offset voltage generator generates the seventh through ninth reference offset voltage levels, and wherein the data recovery circuit generates the output data signal based on the seventh through ninth intermediate signals; and
    a multiplexer having a first multiplexer input terminal for receiving the third clock signal, a second multiplexer input terminal for receiving the fourth clock signal, a select input terminal for receiving a select signal, and a multiplexer output terminal for outputting at least one of the third and fourth clock signals, wherein the data recovery circuit generates the select signal.

10. The CDR circuit of claim 9, wherein the first and second clock signals have a first phase difference therebetween, wherein the first and third clock signals have a second phase difference therebetween, wherein the first and fourth clock signals have a third phase difference therebetween, wherein the first through third phase differences are 180 degrees, 90 degrees, and 270 degrees, respectively, and wherein the first through fourth clock signals have a bit-rate that is half of a bit-rate of the data signal.

11. The CDR circuit of claim 1, further comprising:
    a variable gain amplifier (VGA) having a first VGA input terminal for receiving an input signal, a second VGA input terminal for receiving a first control signal, and a VGA output terminal for generating an intermediate input signal; and a continuous time linear equalizer (CTLE) having a first CTLE input terminal connected to the VGA output terminal of the VGA for receiving the intermediate input signal, a second CTLE input terminal for receiving a second control signal, and a CTLE output terminal for generating the data signal.

12. A clock and data recovery (CDR) circuit, comprising:

first through ninth samplers each having a first sampler input terminal for receiving a data signal, a clock input terminal for receiving one of first through fourth clock signals, a second sampler input terminal for receiving one of first through ninth reference offset voltage levels, and a sampler output terminal for generating first through ninth intermediate signals, respectively;

a clock recovery circuit having first through fourth clock recovery input terminals connected to the sampler output terminals of the first, second, fifth, and eighth samplers for receiving the first, second, fifth, and eighth intermediate signals, respectively, and first through fourth clock recovery output terminals for generating the first through fourth clock signals, respectively;

a level finding circuit having a level finding input terminal connected to the sampler output terminal of the third sampler for receiving the third intermediate signal, a first level finding output terminal for generating a band level signal, and a second level finding output terminal for generating the third reference offset voltage level, wherein the level finding circuit varies the third reference offset voltage level within a predefined amplitude range for generating the band level signal;

an offset voltage generator having a first offset voltage input terminal connected to the first level finding output terminal of the level finding circuit for receiving the band level signal, and first through third offset voltage output terminals for generating one of the fourth and seventh reference offset voltage levels, one of the fifth and eighth reference offset voltage levels, and one of the sixth and ninth reference offset voltage levels, respectively; and a data recovery circuit having first through sixth data recovery input terminals connected to the output terminals of the fourth through ninth samplers for receiving the fourth through ninth intermediate signals, respectively, a first data recovery output terminal for generating an output data signal, and a second data recovery output terminal for generating a select signal.

13. The CDR circuit of claim 12, wherein the level finding circuit is further configured to:

set the third reference offset voltage level at each amplitude level of a plurality of amplitude levels, sequentially, wherein the third reference offset voltage level is set at each amplitude level for a predefined time interval, and wherein each amplitude level is in the predefined amplitude range;

determine a count value corresponding to each amplitude level based on the third intermediate signal, wherein the count value indicates a number of times the third intermediate signal has a first logic state during the predefined time interval, when the third reference offset voltage level is set at the corresponding amplitude level; and generate the band level signal based on the count value corresponding to each amplitude level.

14. The CDR circuit of claim 13, wherein the data signal is a pulse amplitude modulation-4 signal having first through fourth amplitude levels, and wherein the plurality of amplitude levels comprise at least the first through fourth amplitude levels.

15. The CDR circuit of claim 12, further comprising:

a multiplexer having a first multiplexer input terminal for receiving the second clock signal, a second multiplexer input terminal for receiving the fourth clock signal, a select input terminal connected to the second data recovery output terminal of the data recovery circuit for receiving the select signal, and multiplexer output terminal, connected to the second sampler input terminal of the third sampler, for outputting one of the second and fourth clock signals;

a variable gain amplifier (VGA) having a first VGA input terminal for receiving an input signal, a second VGA input terminal for receiving a first control signal, and a VGA output terminal for generating an intermediate input signal; and a continuous time linear equalizer (CTLE) having a first CTLE input terminal connected to the VGA output terminal of the VGA for receiving the intermediate input signal, a second CTLE input terminal for receiving a second control signal, and a CTLE output terminal for generating the data signal.

16. The CDR circuit of claim 15, further comprising:

a VGA adaptation circuit having a VGA adaptation input terminal connected to the first level finding output terminal of the level finding circuit for receiving the band level signal and a VGA adaptation output terminal, connected to the second VGA input terminal of the VGA, for generating the first control signal; and a CTLE adaptation circuit having a first CTLE adaptation input terminal connected to the first level finding output terminal of the level finding circuit for receiving the band level signal and a CTLE adaptation output terminal, connected to the second CTLE input terminal of the CTLE, for generating the second control signal.

17. The CDR circuit of claim 16, wherein the VGA adaptation circuit is configured to:

set the first control signal at each of one or more values, sequentially;

determine first and second feature values corresponding to each of the one or more values of the first control signal based on the band level signal that is generated corresponding to each of the one or more values of the first control signal, respectively; and identify an optimum value of the first control signal from the one or more values based on the first and second feature values corresponding to each of the one or more values of the first control signal.

18. The CDR circuit of claim 16, wherein the CTLE adaptation circuit is configured to:

set the second control signal at each of one or more values, sequentially;

determine a first feature value corresponding to each of the one or more values of the second control signal based on the band level signal that is generated corresponding to each of the one or more values of the second control signal, respectively; and identify an optimum value of the second control signal from the one or more values based on the first feature value corresponding to each of the one or more values of the second control signal.

19. The CDR circuit of claim 12, wherein the first through ninth samplers compare the data signal with the corresponding reference offset voltage level for generating the first through ninth intermediate signals, respectively.

20. The CDR circuit of claim 12, wherein the first and second clock signals have a first phase difference therebetween, wherein the first and third clock signals have a second phase difference therebetween, wherein the first and fourth clock signals have a third phase difference therebetween, wherein the first through third phase differences are 90 degrees, 180 degrees, and 270 degrees, respectively, and wherein the first through fourth clock signals have a bit-rate that is half of a bit-rate of the data signal.

* * * * *